US012788675B2

(12) United States Patent
Truszynski

(10) Patent No.: US 12,788,675 B2
(45) Date of Patent: Nov. 10, 2026

(54) SAUNA

(71) Applicant: TKHolding Truszczyski Kobierzewski Sp. z o.o., Myslowice (PL)

(72) Inventor: Andrzej Truszynski, Cyprysowa (PL)

(73) Assignee: TKHolding Truszczynski Kobierzewski Sp. z o.o, Mysłowice (PL)

( * ) Notice: Subject to any disclaimer, the term of this patent is extended or adjusted under 35 U.S.C. 154(b) by 57 days.

(21) Appl. No.: 19/066,275

(22) Filed: Feb. 28, 2025

(65) Prior Publication Data

US 2025/0275888 A1 Sep. 4, 2025

(51) Int. Cl.
*A61H 33/06* (2006.01)

(52) U.S. Cl.
CPC .................................. *A61H 33/066* (2013.01)

(58) Field of Classification Search
CPC ........... A61H 3/06; A61H 3/066; A61H 3/067
USPC ............................................................ 4/524
See application file for complete search history.

(56) References Cited

U.S. PATENT DOCUMENTS

| | | | | |
|---|---|---|---|---|
| 2010/0017953 | A1* | 1/2010 | O'Keeffe | G06Q 10/0639 219/480 |
| 2019/0167519 | A1* | 6/2019 | Kaps | A61H 33/063 |
| 2025/0234434 | A1* | 7/2025 | Kaps | A61H 33/063 |
| 2025/0262121 | A1* | 8/2025 | Elliott | A61H 33/0087 |

FOREIGN PATENT DOCUMENTS

| | | |
|---|---|---|
| CN | 206667831 | 11/2017 |
| CN | 212224764 | 12/2020 |

* cited by examiner

*Primary Examiner* — Huyen D Le
(74) *Attorney, Agent, or Firm* — Defillo & Associates, Inc.; Evelyn A. Defillo

(57) ABSTRACT

A sauna including six walls with sauna heaters, rows of sauna benches and a space for a sauna master. The walls as well as the walls are pairs of equal length, in front of each wall and in front of the wall there are cascading rows of benches located parallel to these walls, in the center of the cabin there is a set of sauna heaters, which are set with their longer edges, parallel to the walls, where the internal surfaces of the heaters create space for the sauna master, and the ceiling of the sauna cabin is at an angle of 5-15°, and rises towards the audience, and the angles α between walls and are 100-150°, the angles β between walls and are 70-160° and the angles γ between walls and are 100-140°.

4 Claims, 1 Drawing Sheet

SAUNA

FIELD OF THE INVENTION

The subject of the invention is a sauna in the form of a cabin for a large number of people in which the walls are arranged in a hexagonal shape.

BACKGROUND OF THE INVENTION

The sauna ritual consists of a 15-minute session in which water is poured or ice is crushed on stones heated by the sauna electric heaters. The increase in humidity as well as the release of thermal energy from the heated stones ensures a rapid increase in the interior temperature and humidity. The task of sauna master—is to control the amount of poured water and the temperature effects resulting from its operation. As part of the sauna session/ritual, various techniques are used to distribute the heat released from the stones to the interior area of the sauna cabin. Its task is to move air masses in such a way as to distribute the temperature evenly, while at the same time moving as much air mass as possible to the end users inside.

The portable hexagonal sauna, known from the Chinese utility model CN206667831U, can be placed outdoors. To achieve the above goal, the following technical solution was used in the utility model of the hexagonal outdoor sauna: an empty cavity surrounded by six walls connected by aluminum materials, and one of the walls is equipped with a removable glass door, while any of the other surfaces can also be made of glass.

The utility model is also known from the Chinese description CN212224764U and concerns a sauna for quick assembly, which consists of an upper plate, a lower plate and a set of connecting plates. The opposing surfaces of the top plate and bottom plate are provided with locking rings. The locking rings are arranged in a regular hexagonal structure. The underside of the top plate is equipped with locking lugs which are arranged in a ring system. The external mortise and tenon joint allows for precise alignment and initial attachment, then locking tabs on the top plate are inserted into the blind holes for further locking and attachment of the connecting plate assembly for quick installation.

The hexagonal sauna cabins known so far are small and are intended for individual use by a few people, while those that can accommodate more than 50 people are not designed with air flow tests in mind, which is why the energy effect inside them is low. This is mainly due to the fact that their system does not ensure spontaneous or mechanical distribution of heat throughout the sauna cabin. In order to improve air circulation inside the cabins, current saunas use other mechanical solutions to support air movement, including manual solutions.

SUMMARY OF THE INVENTION

The purpose of the invention is to develop a model of the interior of a sauna that can accommodate a significant number of people, preferably over fifty, and is designed for optimal heat distribution inside, while reducing the consumption of electricity and heat and ensuring the best visibility for end customers.

As a result of the research, it was determined that it was possible to eliminate the inconveniences known from the state of the art by changing the shape of the cabins, optimizing the volume, the angle of the main sauna benches (audience), as well as the inclination of the ceiling structure supporting the work of sauna masters.

The essence of the sauna according to the invention is that two pairs of opposite walls are of equal length, and in front of them there are cascading rows of sauna benches located parallel to these walls, in the middle of the cabin there is a set of sauna heaters, which are set with their longer edges parallel to the corresponding walls, where the internal surfaces of the heaters create a space for the sauna master, and the ceiling of the sauna cabin is inclined at an angle of 8° and rises towards the audience, and the angles between the walls are $\alpha$=100-150°, $\beta$=70-160°, $\gamma$=100-140°. It is preferred that angles $\alpha$=100-120°, angles $\beta$=120-160° and angles $\gamma$=100-120°. It is also advantageous that the heaters are placed in a recess, reducing the height of the sauna stove table—in the range of 80-85 cm above the finished floor of the sauna cabin, and when the ceiling of the sauna cabin is suspended at its lowest point at a height of 2.85 m from the floor plane, and rises towards the audience.

The use of the solution according to the invention allowed the creation of a large sauna cabin, intended for a significant number of people, preferably in the range of 50-200 users, which, thanks to its unique shape and volume, limits the consumption of electricity and heat, while increasing the field of view for audience and providing optimal space for sauna rituals, provides the necessary technical spaces for assistive technology. The arrangement of the ceiling walls and the arrangement of the heater were selected using calculations using three-dimensional CFD simulation, thanks to which the optimal parameters of speed, pressure, temperature, in terms of inlet flow rate, location and technical parameters are determined to guarantee optimal circulation and speed of warm air inside the sauna cabin. Thanks to the appropriate arrangement of electric sauna heaters and the geometry of the interior of the volume, heat distribution has been optimized compared to existing solutions. The advantage of the device is that it enables the quick distribution of heat resulting from the sloping ceiling and the perpendicularity of the sauna benches in relation to the heaters arranged in relation to the angle of projection of the sauna benches, creating a space inside free of electric heaters. Thanks to the central hexagonal location of the heaters, sauna masters have unobstructed, easy access to the heater during the ritual, which improves their comfort of work, heat distribution, as well as increases the visibility of end users.

BRIEF DESCRIPTION OF THE DRAWINGS

The subject of the invention is presented in an example of its embodiment in FIGS. 1-2, in which.

DETAILED DESCRIPTION OF THE INVENTION

Example 1

Figure 1:
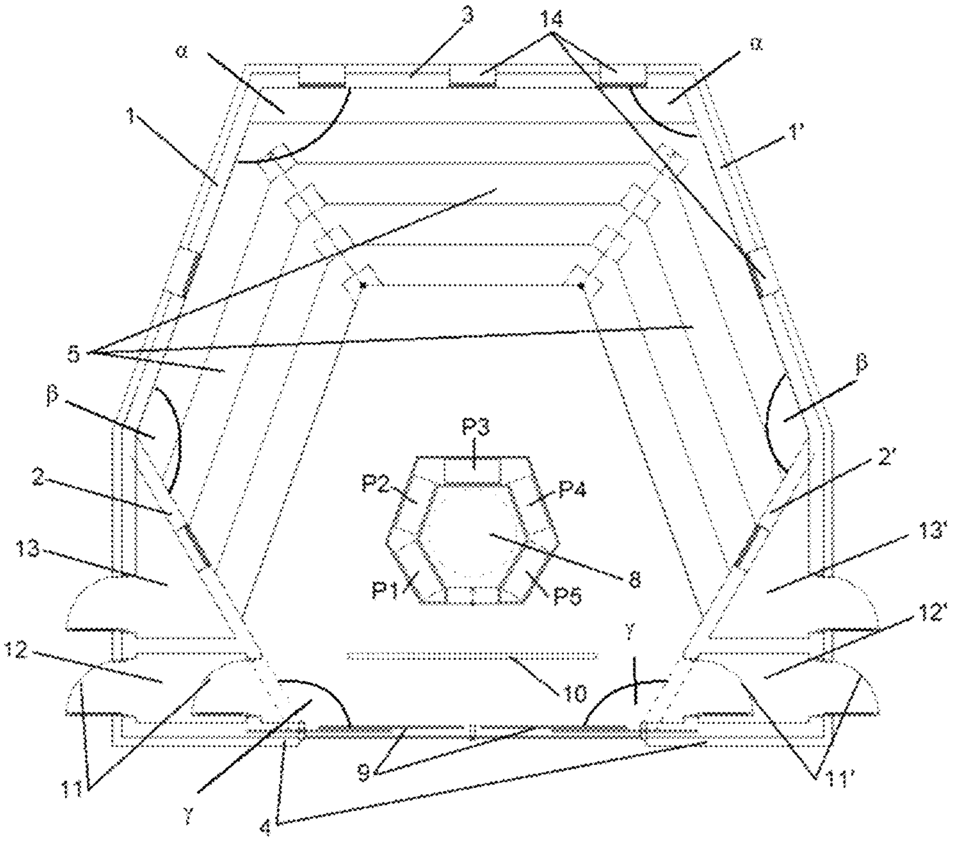
FIG. 1 shows the sauna cabin in a top view.
Figure 2:
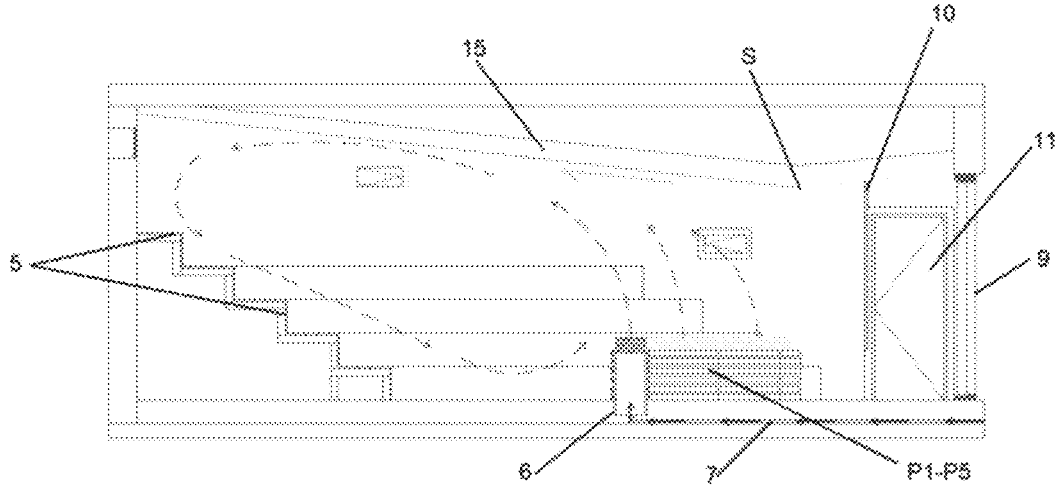
FIG. 2—the same sauna in a vertical section along its axis with the course of air circulation marked.

The sauna consists of six walls, of which walls 1 and 1', 2 and 2' are pairs of equal length, while walls 3 and 4 have different dimensions, and the entire sauna is symmetrical with respect to the axis of symmetry connecting the centers of walls 3 and 4. In front of each of the walls 1 and 1' and in front of wall 3, there are cascading rows of sauna benches 5 located parallel to these walls, with the seats located in front of walls 1 and 1' extending until they meet the corresponding walls 2 and 2'. In the center of the cabin there is a set of five P1-P5 electric sauna heaters, which are placed with their longer edges parallel to walls 1, 1', 2, 2' and 3, respectively. The heaters are located in a recess 6, supplying fresh air through inlet channels 7, two inlets for each heater. The recess reduces the total height of the sauna heater table-within the range of 80-85 cm above the finished floor of the sauna cabin. The internal surfaces of the P1-P5 heaters create a space for the saunmaster 8 in the form of an open hexagon described on the basis of a circle with a diameter of 1.5 m±0.5 m. Between the set of sauna heaters and the wall 4 in which the movable shutters 9 are installed, there is a screen 10 located parallel to the wall 4. In walls 2 and 2', near the movable screens 9 and behind the screen 10, there are exit doors 11 and 11' leading outside, and between the corridors 12 and 12' and the corresponding walls 2 and 2' there are technical rooms 13 and 13'. Additionally, there are 14 windows in the sauna walls. The ceiling 15 of the sauna cabin is at an angle of 8° and its lowest point S is suspended at a height of 2.85 m from the floor and rises towards the audience. The entire sauna cabin is described on the basis of a hexagon, with angles α between walls 1 and 3 and 1' and 3 being 110°, angles β between walls 1 and 2 and 1' and 2' being 130° and angles γ between walls 2 and 4 and 2' and 4 are 120°.

Example 2

The sauna according to the second embodiment had an identical structure as in the first example with the difference that the angles are α=100°, β=160° γ=100°, the ceiling 15 of the sauna cabin is at an angle of 5° and is suspended at its lowest point(S) at a height of 3.5 m from the floor plane.

Example 3

The sauna according to the third embodiment had an identical structure as in the first example with the difference that the angles are α=120°, β=120° γ=120°, the ceiling 15 of the sauna cabin is at an angle of 15° and is suspended at its lowest point(S) at a height of 3.5 m from the floor plane.

The CFD calculations showed the highest benefits, i.e. the maximum increase in the range of energy efficiency for saunas with structures according to examples 1-3, however, the efficiency was increased in other examples of sauna designs in which the angles were α=150°, β=70° γ=140°.

At an angle α greater than 150°, warm air streams break off, as a result of which the air circulation created by the curved ceiling significantly loses its value. If the value of 150° is exceeded, the air streams begin to behave as in the case of standard models of rectangular or polygonal sauna cabins.

The invention claimed is:

1. A sauna comprising:

six walls with sauna heaters, rows of sauna benches and a space for a sauna master, wherein the walls (1) and (1') as well as the walls (2) and (2') are pairs of equal length, in front of each wall (1) and (1') and in front of the wall (3) there are cascading rows of benches (5) located parallel to these walls, in the center of the cabin there is a set of sauna heaters (P1-P5), which are set with their longer edges, parallel to the walls (1, 1', 2, 2' and 3), where the internal surfaces of the heaters (P1-P5) create space for the sauna master (8), and the ceiling (15) of the sauna cabin is at an angle of 5-15°, and rises towards the audience, and the angles α between walls (1 and 3) and (1' and 3) are 100-150°, the angles β between walls (1 and 2) and (1' and 2') are 70-160° and the angles γ between walls (2 and 4) and (2' and 4) are 100-140°.

2. The sauna according to claim 1, wherein the angles α are 100-120°, the angles β between the walls (1 and 2) and (1' and 2') are 120-160° and the angles γ between the walls (2 and 4) and (2' and 4) are 100-120°.

3. The sauna according to claim 1, wherein the heaters (P1-P5) were placed in the recess (6), reducing the height of the sauna heater table—in the range of 80-85 cm above the finished floor of the sauna cabin.

4. The sauna according to claim 1, wherein the ceiling (15) of the sauna cabin is suspended at its lowest point(S) at a height of 2.5-3.5 m from the floor plane, and rises towards the audience.

* * * * *